March 22, 1966     O. A. HOPKINS     3,241,516
MAGNETICALLY ATTACHABLE FLAG HOLDER FOR VEHICLES
Filed May 26, 1964
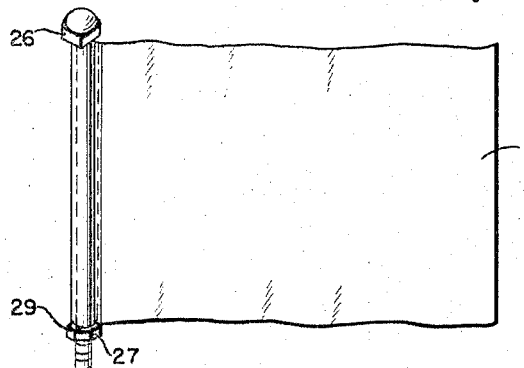
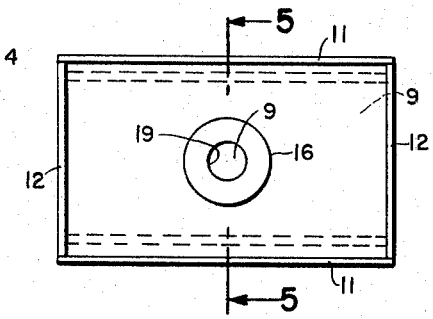
FIG. 3.
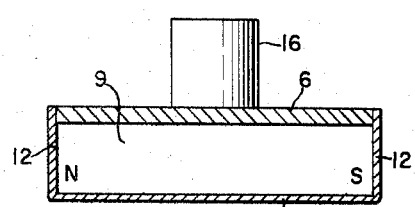
FIG. 4.
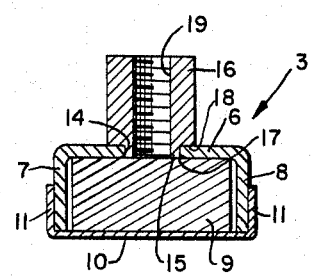
FIG. 5.
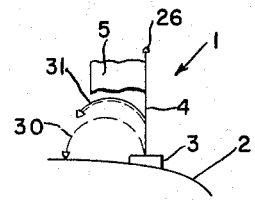
FIG. 1.
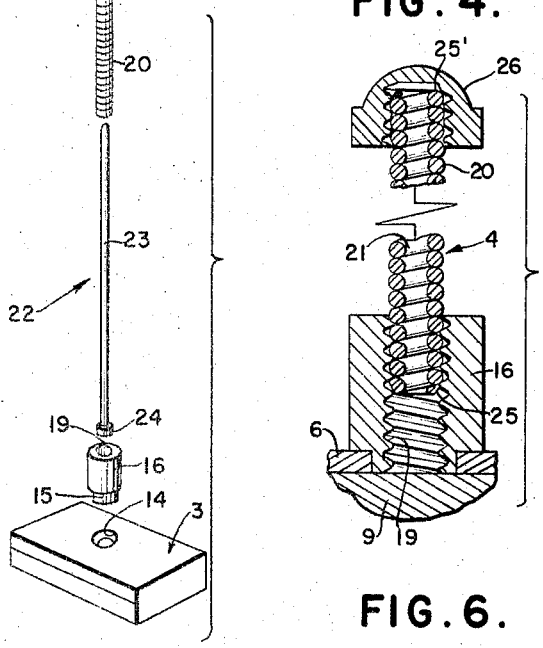
FIG. 6.
FIG. 2.
INVENTOR
Otis A. Hopkins
BY *Arnold and Roylance*
ATTORNEY

United States Patent Office 3,241,516
Patented Mar. 22, 1966

3,241,516
MAGNETICALLY ATTACHABLE FLAG HOLDER
FOR VEHICLES
Otis A. Hopkins, 547 Canton Road, Akron, Ohio
Filed May 26, 1964, Ser. No. 370,299
3 Claims. (Cl. 116—173)

This invention relates generally to flag holders for vehicles, and specifically to a new improved flag holder which can be temporarily attached magnetically to a vehicle to display a flag for a certain event.

More specifically, this invention relates to a unique flag holder having a permanent magnet associated with a base member to secure the flag holder, by magnetic attraction to the surface of a magnetic material portion of a vehicle, and also includes a flexible staff which conspicuously supports a flag for view by others.

For certain occurrences such as funeral processions, parades, etc. it has been found highly desirable to temporarily attach a flag to a vehicle which takes part in the occurrence to identify the vehicle to drivers of other vehicles using the same road or highway.

Applicant has found that to market a flag holder in the present highly competitive market the flag holder must have the following advantageous features:

(1) The flag holder must be easily and readily attachable to any make or model of automotive vehicle to display a flag in a conspicuous manner on the vehicle.

(2) The flag holder must be readily detachable from the vehicle.

(3) The flag holder must not mar or otherwise damage, the surface of the vehicle to which it is attached, or other adjacent vehicle surfaces.

(4) The various parts of the flag holder must be easily replaceable to facilitate repair if they are damaged.

(5) The flag holder must provide for easily and quickly removing and replacing flags to facilitate cleaning or replacement of the flags supported by the holder.

(6) The flag holder must remain securely attached to the surface of the vehicle at speeds or wind velocities of 50 to 60 miles an hour.

(7) The holder must be inexpensive to manufacture as well as attractive in appearance.

Applicant, by this invention, has devised such a flag holder.

Correspondingly, a first object of this invention is a new improved flag holder for temporarily attaching a flag representative of an event or occurrence to a motor vehicle;

Another object of this invention is a flag holder with an improved base construction for temporarily securing same to a vehicle;

A further object is a flag holder with a flexible staff for supporting a flag, said staff being resilient and of unique construction;

Another object is a flag holder with flexible staff and stiffening means associated with the staff to prevent excessive flexing of the staff which could damage surfaces of the vehicle adjacent to the surface on which the flag holder is mounted.

Another and further object of this invention is a flag holder of unique construction which facilitates easy removal and replacement of the flag supported on the staff;

A still further object is a flag holder in accordance with the above objects which is inexpensive to manufacture, rugged in construction, and will not mar the polished surfaces of automotive vehicles when attached thereto.

The following specification, of which the accompanying drawings form a part, explains the manner in which the foregoing objects are attained in accordance with this invention. In the drawings:

FIG. 1 shows the flag holder of this invention attached to the surface of a vehicle;

FIG. 2 is a view in exploded perspective showing various details of the structure of the flag holder;

FIG. 3 is a plan view of the base member of the flag holder;

FIG. 4 is a sectional view looking along lines 4—4 of FIG. 3;

FIG. 5 is a sectional view of the base member looking along lines 5—5 of FIG. 4; and FIG. 6 is an enlarged view in section taken through the axis of the staff and showing the details of the connection at the base and at the cap nut.

Referring now to the drawings in detail and particularly to FIG. 1 there is shown a flag holder 1 in accordance with this invention mounted on the surface of a magnetic material portion 2 of an automobile. Flag holder 1 includes a base 3 which engages the automobile, and a flexible staff 4 projecting upwardly from base 3 and having a flag 5 carried by the portion of the staff remote from the base.

As best seen in FIGS. 2 through 5 base 3 includes a flat body portion 6 of rectangular outline configuration, a first integral leg 7 projecting at right angles to body 3 from a long edge thereof, and a second leg 8 integral with body 6 and projecting from the opposite long edge of body 6 in a direction parallel with leg 7. Body 6 and legs 7 and 8 are formed from magnetic material such as wrought iron. With the base in an upright position as shown in FIGS. 4 and 5, it is apparent that legs 7 and 8 combine with body 6 to provide an inverted U-shaped recess to accommodate a permanent magnet 9 of rectangular parallelepiped shape. A relatively soft thin plastic sheet 10 having side wall portions 11 and end wall portions 12 is adhesively secured to the ends, the sides, and the bottom edges of legs 7 and 8 to retain permanent magnet 9 in the inverted U-shaped recess. As best seen in FIGS. 4 and 5 side wall portions 12 of the sheet extend across and completely enclose the ends of the base, bottom 13 of the sheet extends completely across the open portion between legs 7 and 8, and side wall portions 11 extend partially the height of legs 7 and 8.

As shown in FIG. 5 body 6 is provided with an opening 14 the axis of which is located at the geometric center of this body portion. Opening 14 receives a reduced diameter end portion 15 of a bushing 16, end 15 extending through opening 14 and being mechanically deformed as at 17 to fix bushing 16 to body 6. A transverse annular shoulder 18 provided at the junction between end 15 and bushing 16 limits the extent to which bushing 16 can be inserted into opening 14. Bushing 16 has an internally threaded bore 19 to receive one end of flexible staff 4.

Flexible staff 4 is a stiff helical spring of uniform diameter formed by winding adjacent coils 20 of suitable diameter wire onto a core and then removing the core so that the closely adjacent coils define an elongated opening 21 in the staff.

A stiffening device 22 having a straight rod-like portion 23 is inserted in opening 21, head 24 of the rod acting as a stop to limit the depth of insertion of rod 23. The diameter of rod 23 is slightly less than that of opening 21 to permit easy insertion of the rod into the opening. The diameter of head 24 is slightly less than the inner diameter of threaded bore 19 to permit the head to extend into this opening. The threads of bore 19 are so selected that their pitch is the same as the pitch of coils 20 of flexible staff 4 to permit threading the lower end of the staff into bushing 16 as shown in FIG. 6. To facilitate such threading the end of the staff is preferably beveled as at 25.

The other end of staff 4 is similarly beveled at 25' and is provided with a cap nut 26 having an internally threaded bore to permit threading of the cap onto the staff. Spaced from cap nut 26 along the length of staff 4 is a non-metal collar 27 preferably of rubber or other elastic material, collar 27 elastically gripping the external surface of coils 21 of staff 4 to retain the collar in predetermined spaced relation to cap nut 26. Flag 5 is folded over at one end and stitched to provide, at one side, an opening 29 into which the upper end of staff 4 can be inserted when cap nut 26 is removed. Opening 29 is smaller than the diameter of collar 27 and cap nut 26. The distance between collar 27 and cap nut 26 is the same as the height of the flag so that movement of the flag toward base 3 is prevented by collar 27 and movement of the flag off the end of the staff is prevented by cap nut 26.

When assembled, rod 23 is inserted in opening 22 of flexible staff 4 and the staff is threaded into opening 19 of bushing 16. By virtue of this arrangement rod 23 stiffens only a short portion about ¼ of the length of staff 4. This stiffening of only the lower quarter of staff 4 has been found necessary to prevent damage to the surface of the automobile on which base 3 rests when the automobile is in motion. The stiffening provides sufficient rigidity to the lower part of staff 4 to prevent the staff from whipping back and forth due to high vehicle speeds or high wind velocities. Such whipping without the stiffening rod 23 could cause staff 4 to flex sufficiently so that cap nut 26 strikes the surfaces of the automobile adjacent base 3, which would of course chip the paint or otherwise mar the surface of the automobile finish. Such action is shown diagrammatically in FIG. 1 in dotted lines 30 when rod 23 is not provided, and in dot-dash lines 31 when the rod is provided. It is thus apparent that the stiffening rod 23 is effecitve to limit the flexing of the lower end of staff 4. However, it is desirable to have the upper end of staff 4 somewhat more flexible to permit the staff to yield somewhat due to the action of wind and other air currents since such yielding does not transmit such sharp forces to base 3 which may cause the flag and flag holder to be blown from the vehicle.

As shown in FIG. 5, magnet 9 is centered on body 6 and has each of its sides 32 and 33 slightly spaced from the inner surfaces of legs 7 and 8.

Referring to FIG. 6, it is seen that cap nut 27 has a threaded opening 34 with threads that mate with the coils 20 of staff 4 to allow threading the nut onto the staff. As shown, the coils of staff 20 are wound in a right hand direction and threads in openings 19 and 34 are likewise formed in a right hand direction. Left hand threads for all these elements could, of course, be used. For purposes of clarity stiffening device 22 is not shown in FIG. 6 but it is to be understood that rod 23 normally extends into opening 21, and head 24 is between beveled end 25 of the staff and the upper face of magnet 9.

While a preferred embodiment has been illustrated and described in detail it is to be understood that numerous changes and variations are possible without departing from the scope of this invention. Although the flag holder has, for simplicity of explanation, been shown and described with the axis of shaft 4 vertical, and base 3 essentially horizontal, use of the flag holder in other positions is of course contemplated, this invention being limited only by the scope of the appended claims.

What is claimed is:

1. A flag holder for temporarily attaching a flag to a smooth polished surface of a magnetic material portion of a motor vehicle, the flag holder being particularly characterized by its ability to remain in position on the vehicle during high speed travel of the vehicle and under gusty wind conditions and comprising in combination:
   a base comprising;
      a generally flat body portion of magnetic material,
      a first magnetic material leg projecting downwardly from one side of said body portion, and
      a second magnetic material leg projecting downwardly from the other side of said body portion in spaced apart relation to said first leg;
   a bushing secured to said base and projecting upwardly therefrom;
   said legs and body portion providing an inverted U-shaped recess;
   a permanent bar maget disposed within said recess;
   retaining means of non-magnetic material connected to said base for retaining said magnet in said recess, said non-magnetic means extending across the space between the legs of said inverted U-shaped recess;
   a resilient flag staff comprised of an elongated helical spring wound with the coils thereof in closely adjacent side by side relation for substantially the entire length of said staff, said resilient flag staff being connected to said bushing to project generally upright from said base;
   a flag having a portion thereof surrounding said staff intermediate the ends of the staff and offset toward the upper end of the staff; and
   means on said staff to prevent movement of said flag longitudinally of said staff;
   whereby said staff normally remains upright relative to said base to prominently display said flag, and winds encountered by said flag cause said resilient staff to bend to reduce wind forces transmitted to the base and correspondingly to reduce the tendency for the magnet base to detach from the vehicle under unfavorable wind conditions.

2. A flag holder for temporarily attaching a flag to a smooth polished surface of a magnetic material portion of a motor vehicle comprising, in combination:
   a base comprising:
      a generally flat body portion,
      a first leg projecting downwardly from one side of said body portion,
      a second leg projecting downwardly from the other side of said body portion in spaced apart parallel relation to said first leg, and
      a bushing secured to said body portion and projecting upwardly therefrom;
   said legs and body providing an inverted U-shaped recess;
   a permanent bar magnet disposed in said recess and within the confines thereof;
   a retaining device of non-magnetic material connected to said base for retaining said magnet in said recess, said retaining device including a sheet of flexible non-magnetic material arranged to close the sides and bottom of said inverted U-shaped recess;
   a resilient flag staff in the form of a helically wound spring with the adjacent convolutions thereof in closely adjacent contacting relation to each other, the coils of said spring being wound in a certain direction;
   said bushing further including screw threads formed in the same direction as said coils of said staff and of compatible diameter therewith to permit connecting said staff to said bushing by threading the members together;
   a flag having a portion thereof surrounding said staff intermediate the ends of said staff and offset toward the upper end of said staff;
   first and second retaining elements disposed on said staff respectively above and below said flag to prevent movement of said flag longitudinally of said staff; and
   a staff stiffening member for the portion of said flag staff adjacent the lower end thereof, said stiffening member being in the form of an elongated rod disposed within the convolutions of the staff and originating at said base and extending only partially the length of the staff;

whereby the lower stiffened portion of said resilient staff is restrained from bending in the region adjacent said base, whereas the upper unstiffened portion is free to flex due to various winds encountered by said vehicle in its travel.

3. A flag holder in accordance with claim 2 in which said retaining element disposed on said staff to prevent movement of said flag longitudinally of said staff, in an upward direction, is removably connected to said staff to facilitate replacement of said flag.

References Cited by the Examiner

UNITED STATES PATENTS

| | | | |
|---|---|---|---|
| 1,828,892 | 10/1931 | Felton | 40—145 |
| 2,636,303 | 4/1953 | Freigley et al. | 116—173 |
| 2,794,263 | 6/1957 | Cranmer | 248—206 |
| 2,976,000 | 3/1961 | Gunderson | 40—145 |
| 3,015,162 | 1/1962 | Bohnet | 116—28 |
| 3,067,717 | 12/1962 | Imparato | 116—63 |
| 3,068,573 | 12/1962 | Sedwell | 248—206 |
| 3,082,982 | 3/1963 | Noskowitz | 248—206 |
| 3,148,856 | 9/1964 | Orlando | 248—206 |

LOUIS J. CAPOZI, *Primary Examiner.*